United States Patent [19]

Hayes

[11] Patent Number: 4,912,197
[45] Date of Patent: Mar. 27, 1990

[54] HIGHLY SOLUBLE CLEAR POLYIMIDES

[75] Inventor: Richard A. Hayes, Hockessin, Del.

[73] Assignee: E. I. Du Pont de Nemours and Company, Wilmington, Del.

[21] Appl. No.: 178,092

[22] Filed: Apr. 19, 1988

Related U.S. Application Data

[63] Continuation-in-part of Ser. No. 85,204, Aug. 14, 1987, abandoned.

[51] Int. Cl.$^4$ .............. C08G 69/26; C08G 8/02; C08G 14/00
[52] U.S. Cl. .................... 528/353; 528/125; 528/126; 528/128; 528/172; 528/185; 528/188; 528/229; 528/310; 528/331
[58] Field of Search ............... 528/353, 331, 310, 125, 528/126, 128, 172, 185, 188, 229

[56] References Cited

U.S. PATENT DOCUMENTS

| 3,423,491 | 1/1969 | McLain et al. | 264/49 |
| 3,723,306 | 3/1973 | Bridgeford | 210/638 |
| 3,957,651 | 5/1976 | Kisting | 210/490 |
| 3,959,350 | 5/1976 | Rogers | 528/185 |
| 4,629,777 | 12/1986 | Pfeifer | 528/353 |

FOREIGN PATENT DOCUMENTS 2050251  7/1969  France .

OTHER PUBLICATIONS

Nasa Technical Memorandum 89016, "Soluble Aromatic Polyimides for Film Coating Applications" St. Clair et al., Sep. 1986, Nasa Langley Research Center.

Primary Examiner—John Kight
Assistant Examiner—M. L. Moore

[57] ABSTRACT

Highly soluble, optically transparent to clear aromatic polyimides in the visible range are disclosed. The dianhydrides from which the polyimides are prepared are 4,4'-[2,2,2-trifluoro-1-(trifluoromethyl) ethylidene] bis(1,2-benzenedicarboxylic anhydride) which can be partially replaced with either pyromellitic dianhydride or 3,3',4,4'-benzophenone tetracarboxylic dianhydride. The diamines from which the polyimides are prepared are m- or p- phenylene diamines which are substituted ortho to the amino groups with primary or secondary alkyl groups having 1 to 6 carbon atoms preferably methyl or ethyl.

16 Claims, No Drawings

HIGHLY SOLUBLE CLEAR POLYIMIDES

CROSS REFERENCE TO RELATED APPLICATION

This application is a continuation-in-part of Ser. No. 07/085,204 filed Aug. 14, 1987 now abandoned

BACKGROUND OF THE INVENTION

1. Field of the Invention

The present invention relates to a class of full-cyclized aromatic-polyimides and copolyimides prepared from alkyl substituted diamines and 4,4'-[2,2,2-trifluoro-1-(trifluoromethyl)ethylidene] bis (1,2-benzenedicarboxylic acid anhydride) (6FDA).

2. Prior Art

European Patent Applications 132,221, 141,781, and 181,837 and U.S. Nos. 4,629,685 and 4,629,777 disclose aromatic polyimides in which the diamines are substituted with alkyl groups but do not encompass use of the dianhydride, 6FDA. U.S. No. 4,629,777, col. 6, lines 23,51 discloses polyimides that are soluble in good polar, aprotic solvents.

U.S. No. 3,356,648 discloses the aromatic polyimide derived from 6FDA and 2,2-bis(4-aminophenyl) hexafluoropropane which is soluble in acetone.

U.S. No. 3,959,350 discloses aromatic polyimides derived from 6FDA and various unsubstituted diamines.

U.S. 3,546,175 discloses aromatic polyimides derived from pyromellitic dianhydride or 3,3',4,4'-benzophenonetetracarboxylic dianhydride and 2,4-diaminoisopropyl benzene which are soluble in good aprotic solvents.

U.S. No. 4,145,522 discloses polyimides derived from amino-substituted 4-t-butylphthalic anhydride which have improved solubility characteristics.

U.S. No. 4,588,804 discloses soluble aromatic polyimides derived from 6FDA and various diamines.

U.S. No. 4,592,925 discloses soluble aromatic polyimides derived form 6FDA and 2,2-bis(2 or 3-diaminophenyl) hexafluoropropane.

NASA Technical Memorandum 89016, U.S. No. 4,595,548 and U.S. No. 4,603,061 disclose transparent aromatic polyimides derived from various dianhydrides including 6FDA and ether or thioether bridged multi-ring diamines.

SUMMARY OF THE INVENTION

The present invention relates to aromatic polyimides which are soluble in relatively weak and/or volatile solvents such as acetone. Films formed from these polyimides are highly optically transparent to colorless in the visible range. The polyimides of the present invention are formed from a dianhydride which is 6FDA or combinations of 6FDA and up to 50% pyromellitic dianhydride or up 49% benzophenonetetracarboxylic dianhydride. The diamines are based on m- or p-phenylene diamine substituted with alkyl groups ortho to the amino groups.

DETAILED DESCRIPTION

Polyimides, as a class, tend to be insoluble in a wide range of solvents. This characteristic, along with high softening temperature, have made aromatic polyimide materials very difficult to fabricate into useful products. The fabrication of films, coatings and other structures from insoluble aromatic polyimides generally requires elaborate processes. For example films may be formed from the soluble polyamide-acid precursor of an insoluble polyimide. The film, after excess solvent is removed, is thermally and/or chemically cured to dehydrate the precursor polyimide acid film to the cyclized polyimide film. There are further problems, such as void formation caused by the evolution of the by-product water during the cure step and the like.

The above-mentioned shortcomings have been circumvented in the art through the use of fully-cyclized, soluble polyimides. The majority of these materials are only soluble in good organic solvents, typically N-methylpyrrolidone, N,N-dimethylacetamide, dimethylformamide, dimethyl sulfoxide, m-cresol etc. Fully-cyclized polyimides which are soluble in much weaker solvents, such as acetone, are rare. In a recent review (see F. W. Harris, W. A. Feld, and L. H. Lanier, *AM. Chem. Soc., Polymer Preprints*, 17, (1976) pp. 353–358) of soluble polyimides, less than 5% of the examples were soluble in acetone. Solubility in weaker solvents, such as acetone, offers unique fabrication opportunities not available to insoluble or less soluble polyimides. Weaker solvents, such as acetone, tend to have higher volatilities than better solvents, such as N-methylpyrrolidone. It, therefore, permits the use of lower temperatures to form films, coatings, and the like from acetone soluble polyimides than from polyimides which are only soluble in better solvents.

Aromatic polyimides find utility as coatings, especially where durability in anticipated high temperature applications is required. There are obvious economic advantages associated with application of such coatings from solution in a volatile, inexpensive, non-toxic solvent. In the past there have been isolated reports of solubility of aromatic polyimides in acetone (U.S. No. 3,356,648; Webster, *Advances in Chemistry* #129, Am. Chem. Soc., 1973, p 61; Webster, Final Report NAS8-21401, Marshall Space Flight Center, 1973). All of the products so described previously employ expensive partially fluorinated aromatic diamines which are not readily available. In some cases they have only limited utility at elevated temperatures.

The products of the present invention fill the need for acetone-soluble aromatic polyimides and at the same time retain good high temperature utility while being derived from more readily available diamines.

Polyimides which are soluble in weaker solvents also allow for easier fabrication of multilayer structures. It is difficult to fabricate multilayer structures in which the material of the coating is soluble only in solvents to which the material of the substrate is sensitive. This problem is solved when polyimides are available which are soluble in weaker solvents to which the material of the substrate is insensitive. An example of the above can occur in the application of polyimide passivating coatings on electronic devices. Application of said coatings requires solutions of aromatic polyimides, or their polyamide acid precursors, which are soluble only in good solvents, such as N-methylpyrrolidone. However, often components of said electronic devices are sensitive to such good solvents and may be damaged. The problem can be circumvented through the use of aromatic polyimides which are soluble in much weaker solvents which do not damage such components.

The present invention circumvents the above shortcomings and provides a class of fully-cyclized polyimides which are soluble in weaker solvents, such as acetone. This more soluble class of polyimides is prepared essentially from ortho-alkyl-substituted aromatic diamines and, at least in part, 4,4'-[2,2,2-trifluoro-1-(trifluoromethyl)ethylidene]bis(1,2-benzenedicarboxylic acid anhydride) (6FDA). The polyimide compositions of the present invention contain the following repeating units:

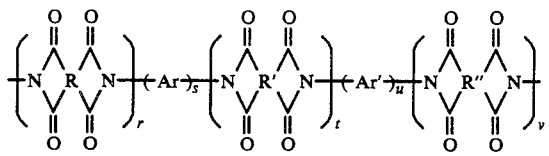

where —Ar— is

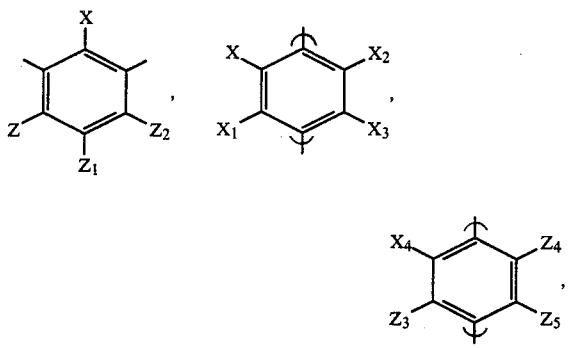

or mixtures thereof, —Ar'— is

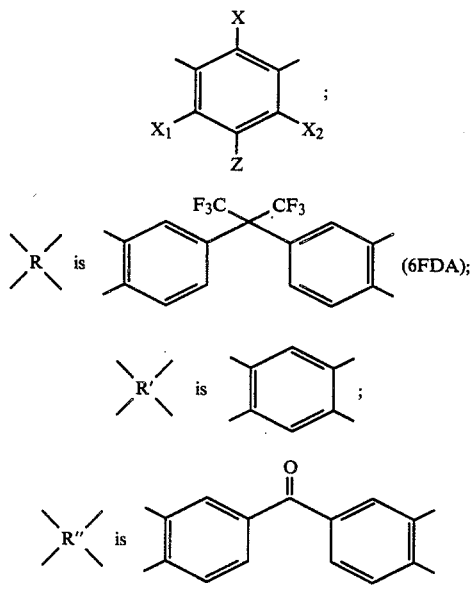

—X, —$X_1$, —$X_2$, —$X_3$, and —$X_4$ are independently primary or secondary alkyl groups having 1 to 6 carbon atoms preferably methyl or ethyl, —Z, —$Z_1$, —$Z_2$, —$Z_3$, —$Z_4$, and —$Z_5$ are independently —H or —X.

r = 100% — (t + v)
t = 0–50% when v = 0%
v = 0–49%, preferably 0–25%, when t = 0%
s = 100% — u
u = 100% when (t + v) > 1%

It is suggested that the surprisingly enhanced solubility found for this class of high temperature aromatic polyimides is a direct result of a combination of structural features incorporated therein. As taught in the prior art, some fully-cyclized aromatic polyimides which incorporate 4,4'[2,2,2-trifluoro-1-(trifluoromethyl)ethylidene]bis-(1,2-benzenedicarboxylic acid anhydride) (6FDA) are soluble in good aprotic solvents, such as N-methyl pyrrolidone. This solubility is usually attributed to the hexafluoroisopropylidene function incorporated therein which serves as a separator group (see, for example U.S. No. 4,595,548 and U.S. 4,603,061) to prevent ring conjugation within the polyimide chain. This function further serves to disrupt the macromolecular structure of the polyimide chain, thus hindering inter-chain organization. This incorporation of 6FDA into aromatic polyimides is, however, rarely a sufficient criterion to provide enhanced polymer solubility in weak solvents such as acetone.

The ortho-alkyl substituents of the diamine function tend to cause the aromatic residue of the diamine function to be held out of the plane of the imide function and its aromatic residue. Electronic ring conjugation within the aromatic polyimide chain is, therefore, greatly reduced. Further, the before-mentioned alkyl substituents sterically block strong electronic interactions between different polyimide chains within a film and/or coating. However, as taught in the prior art, the incorporation of ortho-alkyl substituents into aromatic polymides is not, by itself, a sufficient criteria to provide enhanced polymer solubility in weak solvents such as acetone.

The combination of the above-mentioned structural features serves to greatly reduce inter-chain and intra-chain interactions. It is this reduction which serves to give the surprisingly high solubilities of this class of high temperature, aromatic polyimides. Regardless of the mechanism, the finding that the class of aromatic polyimides described in this invention have greatly enhanced solubilities in weak solvents is surprising in light of the prior art's teachings.

A further advantage of these highly soluble, high temperature polyimides is that they form highly optically transparent-to-colorless in the visible range films. A need has been shown for high temperature, flexible polymeric film and coating materials that have high optical transparency in the 300–600 nm range of the electromagnetic spectrum. Potential applications for such materials includes use on antennae, solar cells and thermal control coating systems in space components. Aromatic polyimide films have found utility in many aerospace and commercial applications where long-term durability at temperatures between 200° C. to 300° C. are required along with short contact times at temperatures exceeding 300° C. Because of these and other exceptional properties, aromatic polyimides have shown potential for use on space structures. Unfortunately, commercially-available polyimide films are often highly colored; e.g., Kapton ® film (manufactured by E. I. Du Pont de Nemours and Company) is typically amber in color. These, therefore, strongly absorb in the 300 to 600 nm range of the electromagnetic spectrum.

The present invention overcomes the above shortcomings and provides a class of soluble, fully-cyclized polyimides which form highly optically transparent-to-colorless in the visible range films while maintaining advantageous high temperature properties. A majority of the examples cited herein form clear and essentially colorless films which are tough and flexible and can be creased without cracking. Further, these films have been shown to be essentially devoid of absorptions at or above 500 nm in the visible and in ultraviolet absorption spectrometry measurements.

In combination with the before-mentioned optical properties, the high solubility of this class of aromatic polyimides, as described before, allows great advantage in the fabrication of films and/or coatings for potential applications. Highly optically transparent-to-colorless in the visible range polyimide films disclosed in the prior art (e.g. U.S. No. 4,595,548 and U.S. No. 4,603,061) require extensive processes for their fabrication. Due to their high solubility, the class of fully-cyclized polyimides disclosed herein may be easily dissolved in highly-volatile weak solvents and films and/or coatings may be produced by the teachings of the art. Extensive heating cycles to drive off residual solvents or to cure the polyamic acid precursors to the fully-cyclized polyimide, as is taught in the prior art, are not required.

It is believed that the highly optically transparent-to-colorless in the visible range properties of films and/or coatings of films of the present polyimides is a direct consequence of their chemical compositional structure. The ortho-alkyl substituents of the diamine function tend to sterically-crowd the imide linkage. As a direct consequence of this, the aromatic residue of the diamine function is held out of the plane of the imide function and the aromatic residue of the dianhydride residue. Electronic ring conjugation within the aromatic polyimide chain is, therefore, greatly reduced. Further, the before-mentioned alkyl substituents sterically block strong electronic interactions between different polyimide chains within a film and/or coating. Incorporation of bulky ortho-alkyl substituents into the diamine function of the polyimide structure greatly reduces the formation of strong inter-chain and intra-chain electronic interactions, such as charge-transfer complexes, which cause large absorptions in the UV-visible range of the electromagnetic spectrum. Regardless of the mechanism, the finding that the class of polyimides described herein are highly optically transparent-to-colorless in the visible range is surprising in light of the prior art's teachings that such properties were, at least in part, the result of the incorporation of electron-withdrawing groups and/or "separator" groups within the structure of the diamine function. The diamine functions of the present invention incorporate neither electron-withdrawing groups (alkyl substituents are usually considered electron-donating in the art) nor "separator" groups.

It is also an object of this invention to provide films and/or coatings from a class of highly-soluble, aromatic polyimides with high optically transparent-to-colorless in the visible range properties as disclosed herein and retain the high temperature properties which are highly-valued in many commercial applications.

A subclass of the herein disclosed class of aromatic polyimides are auto-photochemically crosslinkable. The subclass is defined as those polyimides of this invention which incorporate 3,3',4,4'-benzophenonetetracarboxylic dianhydride. The photochemical crosslinking reaction occurs without the addition of added components, such as sensitizers, chain carriers and the like. This avoids possible complications in the film and/or coating formation step, the photochemical crosslinking step, or the use of the resulting films and/or coatings. For example, if such added components were lost after the photochemical crosslinking step through extraction or other procedures, the resulting film and/or coating may have greatly different physical properties. The mechanism of the photochemical crosslinking reaction is believed to include the absorption of the photochemical energy by the benzophenone chromophore, abstraction of the hydrogen atom from the benzylic function of the alkyl substituent on the diamine by an excited high energy state of the benzophenone function, followed by recombination of the resulting free radicals to form the crosslink. Photochemical mechanisms of this type are described in current photo chemistry textbooks and are generally accepted by those practicing the art. The use of the herein described photochemical crosslinking reaction is not predicated upon the actual details of the mechanism and the above suggested mechanistic details should not limit the use of this invention. Such crosslinking would serve to greatly reduce the solvent sensitivity of the films and/or coatings of this invention, thus providing enhanced environmental resistance and greater permanence to the composite structure.

The combination of surprising physical properties of the class of aromatic polyimides described herein, i.e.; (1) enhanced solubility in weak solvents, such as acetone, (2) highly optically transparent-to-colorless in the visible range film and/or coating properties and (in part) (3) auto-photochemical crosslinkability, along with the retention of high temperature properties, provide a class of aromatic polyimides which meet a unique set of criteria for a wide range of applications.

The class of polyimides and copolyimides disclosed herein find use as membrane materials in gas separations and electronic applications. These include uses as a photo resist material, a protective coating for semiconductors, dielectric layers for multilayer integrated circuits, high temperature solder masks, bonding multilayer circuits, final passivating coatings on electronic devices, and the like. Highly optically transparent-to-colorless in the visible range aromatic polyimide film and/or coatings have potential for many space applications; for example, use on antennae, solar cells and thermal control coating systems in space components.

The membranes of the present invention are generally useful in separating mixtures of gases. Specific examples of such separations include recovery of hydrogen in oil refineries and in ammonia plants, separation of carbon monoxide and hydrogen in syngas systems, separation of carbon dioxide or hydrogen sulfide from hydrocarbons, and enrichment of oxygen and nitrogen from air for increased combustion or inerting streams, respectively.

EXAMPLES

Example 1

Dimethyl sulfoxide (500 ml) was added to 4,4'-[2,2,2-trifluoro-1(trifluoromethyl)ethylidene]bis (1,2-benzenedicarboxylic anhydride) (6FDA, 88.87 g, 0.20 mol) and 2,4,6-trimethyl-1,3-phenylenediamine (30.01 g, 0.20 mol) at 50° C. in an inert atmosphere of nitrogen with stirring. After stirring at 50° C. for 2 hours, a mixture of acetic anhydride (75.8 ml, 0.8032 mol) and triethylamine (112.94 ml, 0.8104 mol) were added and the reaction was allowed to stir for an additional 2 hours at 50° C. under an inert atmosphere. The viscous reaction solution was precipitated in methanol, and the white solid was filtered and dried in a vacuum oven overnight at room temperature, at 110° C. for 2 hours, and at 220° C.

for 5 hours. This gave 108.8 g of an off-white polyimide. This polyimide was soluble at greater than 15% solids (based on polymer weight) in acetone, methylene chloride, N,N-dimethylformamide, methyl ethyl ketone, N,N-dimethylacetamide, methyl acetate, tetrahydrofuran, N-methylpyrrolidone, dioxane, dimethyl sulfoxide, propylene carbonate, gamma-butyrolactone and m-cresol.

Differential Scanning Calorimetry (DSC) was performed on the above polymer using a Du Pont Thermal Analyzer Model 990-3 with cell model HCB1-S/N00523, Baseline slope=5.0 in a nitrogen atmosphere at a 10° C./minute progress rate. Transitions correlatable to a Tg were observed with an onset temperature at 365° C. and a midpoint temperature at 385° C.

Thermogravimetric Analysis (TGA) was performed on the above polymer using a Du Pont Thermogravimetric Analyzer Model 99-2 with cell Model 951-5 in a nitrogen atmosphere at a 10° C./minute progress rate. A 5% weight loss was observed at 540° C. and a 40% weight loss was observed at 660° C.

Films of the polyimide prepared above were cast from a 10% polymer solution based on weight in N-methylpyrrolidone onto a glass plate treated with Du Pont TEFLON ® dry lubricant at 80° C. with a 15-mil ($38 \times 10^{-5}$ m) knife gap. The films were dried on the plate at room temperature, stripped off the plate and dried at room temperature overnight in a vacuum oven, and then at 200° C. for 6 hours in a vacuum oven.

Du Pont TEFLON ® dry lubricant contains a fluorocarbon telomer which reduces the adhesion of the film to the glass plate.

The films were tough and flexible and could be creased without cracking. These films, which were about 1.5 mil ($3.8 \times 10^{-5}$ m) in thickness, were essentially clear and colorless. Ultraviolet and visible absorption spectrometry measurements on these films demonstrated that they essentially had no absorptions at or greater than 500 nm.

Films of the above polyimide were cast from a 15% polymer solution based on weight in acetone onto a glass plate treated with Du Pont TEFLON dry lubricant at room temperature under a nitrogen atmosphere in a dry box with a 5 mil ($12.67 \times 10^{-5}$ m) knife gap. The films were tackless in the less than five minutes. The films were dried on the plate and then stripped off the plate. The essentially clear and colorless films were tough and flexible and could be creased without cracking.

Example 2

To a solution of 2,3,5,6-tetramethyl-1,4-phenylene diamine (16.4 g, 0.10 mol) in N-methylpyrrolidone (250 ml) was added portionwise 4,4'-[2,2,2-trifluoro-1-(trifluoromethyl)ethylidene]bis (1,2-benzenedicarboxylic anhydride), (6FDA 44.4 g, 0.10 mole, four portions, last portion washed in with 100 ml N-methylpyrrolidone) under an inert atmosphere with stirring at room temperature. After the golden solution had stirred for three hours at room temperature, a solution of acetic anhydride (37.9 ml, 0.4016 mol) and triethylamine (56.5 ml, 0.4052 mol) was added with rapid stirring. The resultant orange solution was stirred at room temperature for two hours and then precipitated in methanol. The resulting white solid was collected by filtration, air dried, and then dried in a vacuum oven at room temperature overnight, at 100° C. for 3 hours, and at 250° C. for 3 hours to give 54.2 g product.

This polyimide is soluble at greater than 20% solids (based on polymer weight) in acetone, dichloromethane, N-methylpyrrolidone, and m-cresol.

Films of the polyimide prepared above were cast from a 15% polymer solution (based on weight) in N-methylpyrrolidone onto a glass plate treated with Du Pont TEFLON ® dry lubricant at 75° C. with a 15-mil ($38.4 \times 10^{-5}$ m) knife gap. The films were dried on the plate at 75° C. for 25 minutes, cooled to room temperature overnight, and at 120° C. for 4 hours, and at 220° C. for 3 hours in a vacuum oven.

The films were tough and flexible and could be creased without cracking. These films, which averaged about 1.5 mil ($3.8 \times 10^{-5}$ m) in thickness, were essentially clear and colorless.

Differential Scanning Calorimetry (DSC) was performed on the above polymer using a Du Pont Thermal Analyzer Model 990-3 with cell model HCB1-S/N00523, Baseline slope=5.0 in a nitrogen atmosphere at a 10° C./minute progress rate. No transitions correlatable to a Tg or Tm were observed up to 400° C.

Thermogravimetric Analysis (TGA) was performed on the above polymer using a Du Pont Thermogravimetric Analyzer Model 99-2 with cell Model 951-5 in a nitrogen atmosphere at a 10° C./minute progress rate. A 5% weight loss was observed at 525° C. and a 40% weight loss was observed at 640° C.

Example 3

To a solution of 2,3,5,6-tetramethyl-1,4-phenylenediamine (16.43 g, 0.10 mol) and 2,4,6-trimethyl-1,3-phenylenediamine (15.02 g, 0.10 mol) in N-methylpyrrolidone (300 ml) was added portion-wise 4,4'-[2,2,2-trifluoro-1-(trifluoromethyl)ethylidene]bis (1,2-benzenedicarboxylic anhydride), (6FDA 88.8 g, 0.20 mol, added in 9 portions, the last portion washed in with N-methylpyrrolidone (166 ml)) under an inert atmosphere with stirring at room temperature. The clear yellow solution was stirred at room temperature for 3 hours, becoming so viscous that additional N-methylpyrrolidone (200 ml) was added. A solution of acetic anhydride (75.8 ml, 0.8032 mol) and triethylamine (112.94 ml, 0.8104 mol) was added with rapid stirring at room temperature. A white solid came out of solution, but slowly redissolved to form a viscous orange-yellow solution. After stirring for 2 hours at room temperature, the reaction solution was precipitated in methanol. The resulting off-white solid was collected, washed with additional methanol, air dried and dried in a vacuum oven at room temperature overnight, at 100° C. for 3 hours, and at 250° C. for 3 hours to give 109.4 g product.

This polyimide is soluble at greater than 20% solids (based on polymer weight) in acetone, dichloromethane, N-methylpyrrolidone, and m-cresol.

Differential Scanning calorimetry (DSC) was performed on the above polymer using a Du Pont Thermal Analyzer Model 990-3 with cell model HCB1-S/N00523, Baseline slope=5.0 in a nitrogen atmosphere at a 10° C./minute rate. No transitions correlatable to a Tg or Tm were observed up to 400° C.

Thermogravimetric Analysis (TGA) was performed on the above polymer using a Du Pont Thermogravimetric Analyzer Model 99-2 with cell Model 951-5 in a nitrogen atmosphere at a 10° C./minute progress rate. A 5% weight loss was observed at 535° C. and a 40% weight loss was observed at 655° C.

Films of the polyimide prepared above were cast from a 15% polymer solution (based on weight) in N-methylpyrrolidone onto glass treated with Du Pont TEFLON® dry lubricant at 80° C. with a 15 mil ($38.4 \times 10^{-5}$ m) knife gap. The films were dried on a plate at 80° C. for 25 minutes, cooled to room temperature, stripped off the plate and dried in a vacuum oven at room temperature overnight and at 120° C. for 4 hours.

The films were tough and flexible and could be creased without cracking. These films, which ranged in thickness between 1 to 2 mils, were essentially clear and colorless.

Example 4

To a solution of 2,4,6-trimethyl-1,3-phenylene diamine (30.01 g, 0.20 mol) in N-methylpyrrolidone (500 ml) was added 1,2,4,5-benzenetetracarboxylic dianhydride (121.81 g, 0.10 mol) under an inert atmosphere with stirring at 50° C. After stirring for 30 minutes, 4,4'-[2,2,2-trifluoro-1(trifluoromethyl)ethylidene]bis, (1,2-benzenedicarboxylic anhydride) (44.4 g, 0.10 mol, added in 2 portions, the last portion washed in with N-methylpyrrolidone (250 ml)) was portionwise added with stirring at 50° C. The orange reaction solution was allowed to stir at 50° C. overnight. A solution of acetic anhydride (75.84 ml, 0.80 mol) and triethylamine (112.94 ml, 0.81 mol) was added with rapid stirring causing the reaction solution to turn brown. After stirring at 50° C. for 2 hours, the reaction solution was precipitated in methanol. The resulting off-white solid was collected by filtration, washed with methanol, air dried and dried in a vacuum oven at room temperature overnight, at 100° C. for 4 hours, and at 250° C. for 3 hours to give 86.8 g product.

This polyimide is soluble at greater than 10% solids (based on polymer weight) in acetone, N,N-dimethylacetamide, m-cresol, N-methylpyrrolidone, methylene chloride, methyl acetate, methyl ethyl ketone, N,N-dimethylformamide, gamma-butyrolactone, dimethyl sulfoxide, and ethylene glycol dimethyl ether.

Films of the polyimide prepared above were cast from a 15% polymer solution (based on weight) in N-methylpyrrolidone onto a glass treated with Du Pont TEFLON® dry lubricant at 80° C. with a 15 mil ($38.4 \times 10^{-5}$ m) knife gap. The films were dried on a plate at 80° C. for 25 minutes, stripped off the plate and dried in a vacuum oven at room temperature overnight and at 120° C. for 4 hours.

The films were tough and flexible and could be creased without cracking. These films, which averaged about 1.5 mil ($3.8 \times 10^{-5}$ m) in thickness, were clear and a pale yellow color.

Example 5

To a 50° C. stirred solution of 2,4,6-trimethyl-1,3-phenylenediamine (30.01 g, 0.20 mol) in N-methylpyrrolidone (600 ml) under an inert atmosphere was added 3,3',4,4'-benzophenone tetracarboxylic dianhydride (3.22 g, 0.01 mol). After stirring 0.5 hours, 4,4'-[2,2,2-trifluoro-1(trifluoromethyl)ethylidene]bis(1,2-benzenedicarboxylic anhydride) (84.36 g, 0.19 mol, added in eight portions, the last portion washed in with 200 ml N-methylpyrrolidone) was added at 50° C. The yellow solution was stirred at 50° C. overnight. A solution of acetic anhydride (75.8 ml, 0.80 mol) and triethylamine (112.9 ml, 0.81 mol) was rapidly added and the resulting solution was precipitated in methanol. The resulting white solid was collected by filtration, washed with methanol and dried in a vacuum oven at room temperature overnight, at 100° C. for 5 hours, and 250° C. for 2 hours to give 104.4 g white product.

This polyimide is soluble at greater than 10% solids (based on polymer weight) in acetone, methylene chloride, dioxane, ethylene glycol dimethyl ether, methyl ethyl ketone, N,N-dimethyl acetamide, N,N-dimethyl formamide, methyl acetate, gamma-butyrolactone, propylene carbonate, dimethyl sulfoxide, and N-methylpyrrolidone.

Differential Scanning calorimetry (DSC) was performed on the above polymer using a Du Pont Thermal Analyzer Model 990-3 with cell model HCB1-S/N00523, Baseline slope=5.0 in a nitrogen atmosphere at a 10° C./minute rate. No transitions correlatable to a Tg or Tm were observed up to 400° C.

Thermogravimetric Analysis (TGA) was performed on the above polymer using a Du Pont Thermogravimetric Analyzer Model 99-2 with cell Model 951-5 in a nitrogen atmosphere at a 10° C./minute progress rate. A 5% weight loss was observed at 525° C. and a 40% weight loss was observed at 660° C.

Films were cast from a 15% solution of the above polymer (based on weight) in N-methylpyrrolidone onto a glass plate treated with Du Pont dry lubricant at 80° C. with a 15 mil ($38 \times 10^{-5}$ m) knife gap. The films were dried on a plate at 80° C. for 25 minutes, cooled to room temperature, stripped off the plate and dried in a vacuum oven at room temperature overnight and at 120° C. for 4 hours.

The films were tough and flexible and could be creased without cracking. These films, which averaged about 1.5 mil ($3.8 \times 10^{-5}$ m) in thickness, were essentially clear and colorless.

The above films were irradiated with light from a 450 watt Hanovia medium pressure mercury arc lamp for 15 minutes on each side of the film at less than 50° C. A portion of the film was placed into N-methylpyrrolidone, a good solvent for the uncrosslinked polymer. Some of the film dissolved leaving long strands of crosslinked polymer out of solution.

Example 6

To a stirred solution of 2,4,6-trimethyl-1,3-phenylenediamine (30.01 g, 0.20 mol) in N-methylpyrrolidone (600 ml) under an inert atmosphere was added 3,3',4,4'-benzophenone tetracarboxylic dianhydride (6.44 g, 0.02 mol, washed in with 50 ml N-methylpyrrolidone). After the solution stirred for 0.75 hours, 4,4'-[2,2,2-trifluoro-1-(trifluoromethyl)ethylidene]bis (1,2-benzenedicarboxylic anhydride) (79.92 g, 0.18 mol, added in seven portions, the last portion washed in with 150 ml N-methylpyrrolidone) was added and the yellow reaction solution stirred for 2 hours. A solution of acetic anhydride (75.8 ml, 0.80 mol) and triethylamine (112.9 ml, 0.81 mol) was rapidly added to the reaction solution and the resulting yellow solution stirred for 2 hours. The reaction solution was precipitated in methanol. The resulting white solid was collected by filtration, washed with methanol and dried in a vacuum oven at room temperature overnight, at 100° C. for 3 hours, and at 250° C. for 3 hours to give 119.5 g product.

This polyimide is soluble at greater than 20% solids (based on polymer weight) in acetone, dichloromethane, m-cresol, dimethyl sulfoxide and N-methylpyrrolidone.

Films were cast from a 15% solution of the above polymer (based on weight) in N-methylpyrrolidone onto a glass plate treated with Du Pont TEFLON® dry lubricant at 75° C. with a 15-mil ($38 \times 10^{-5}$ m) knife gap. The films were dried on the plate at 75° C. for 25 minutes, cooled to room temperature, stripped off the plate, and dried in a vacuum oven at room temperature overnight and at 120° C. for 4 hours.

The films were tough and flexible and could be creased without cracking. These films, which averaged about 1.5 mil ($3.8 \times 10^{-5}$ m) in thickness, were clear and essentially colorless.

The above films were irradiated with light from a 450 watt Hanovia medium pressure mercury arc lamp for 15 minutes on each side of the film at less than 50° C. A portion of the film was placed in N-methylpyrrolidone, a good solvent for the uncrosslinked polymer. Some of the film went into solution leaving short strands of crosslinked polymer out of the solution.

Example 7

To a 50° C. stirred solution of 2,4,6-trimethyl-1,3-phenylenediamine (30.01 g, 0.20 mol) in N-methylpyrrolidone (350 ml) under an inert atmosphere was added 3,3',4,4'-benzenophenone tetracarboxylic dianhydride (9.21 g, 0.03 mol). After stirring at 50° C. for 0.3 hours, 4,4'-[2,2,2-trifluoro-1(trifluoromethyl)ethylidene]-bis(1,2-benzene dicarboxylic dicarboxylic anhydride) (76.1 g, 0.17 mol, added in four portions, the last portion washed in with 150 ml N-methylpyrrolidone) was added and the resulting reaction solution stirred at 50° C. overnight. A solution of acetic anhydride (78.5 ml, 0.80 mol) and triethylamine (112.9 ml, 0.81 mol) was rapidly added and the resulting yellow solution stirred at 50° C. for 2 hours. The reaction solution was precipitated in methanol, the resulting white solid collected by filtration, washed with methanol and dried in a vacuum oven at room temperature overnight, at 100° C. for 3 hours and at 220° C for 3 hours to give 104.2 g. product.

This polyimide is soluble at greater than 10% solids (based on polymer weight) in acetone, dichloromethane, dimethyl sulfoxide, m-cresol, N-methylpyrrolidone, chloroform, propylene carbonate, and methylacetate.

Films were cast from a 15% solution of the above polymer (based on weight) in N-methylpyrrolidone onto a glass plate treated with Du Pont TEFLON® dry-lubricant at 90° C. with a 15 mil ($38 \times 10^{-5}$ m) knife gap. The films were dried on the plate at 90° C. for 25 minutes, cooled to room temperature, and dried in a vacuum oven at room temperature overnight. The films were stripped off the plate and further dried in a vacuum oven at 120° C. for 4 hours.

The films were tough and flexible and could be creased without cracking. These films, which averaged about 1.5 mil ($3.8 \times 10^{-5}$ m) in thickness, were clear and essentially colorless.

The above films were irradiated with light from a 450 watt Hanovia medium pressure mercury arc lamp for 15 minutes on each side of the film at less than 50° C. A portion of the film was placed in N-methylpyrrolidone, a good solvent for the uncrosslinked polymer. The solvent became slightly colored but the majority of the film remained out of solution and unswollen.

Example 8

To a 50° C. stirred solution of 2,4,6-trimethyl-1,3-phenylenediamine (30.01 g, 0.20 mol) in N-methylpyrrolidone (350 ml) under an inert atmosphere was added 3,3',4,4'-benzophenone tetracarboxylic dianhydride (16.1 g, 0.05 mol) and the resulting yellow solution stirred for 0.5 hours. To this was added 4,4'-[2,2,2-trifluoro-1(trifluoromethyl)ethylidene]bis(1,2-benzenedicarboxylic acid anhydride) (66.6 g, 0.15 mole, in four portions, the last portion washed in with 150 ml N-methylpyrrolidone) to give a light yellow solution. After stirring overnight at 50° C. a solution of acetic anhydride (75.8 ml, 0.80 mol) and triethylamine (112.9 ml, 0.81 mol) was rapidly added and the resulting reaction solution stirred at 50° C. for 2 hours. The reaction solution was precipitated in methanol, the resulting solid collected by filtration, washed with methanol and dried in a vacuum oven at room temperature overnight, at 100° C. for 3 hours and at 200° C. for 3 hours. The product was an off-white solid (102.3 g).

This polyimide is soluble at greater than 20% solids (based on polymer weight) in acetone, dichloromethane, dimethyl sulfoxide, m-cresol, and N-methylpyrrolidone.

Films were cast from a 15% solution of the above polymer (based on weight) in N-methyl pyrrolidone onto a glass plate treated with Du Pont TEFLON® dry lubricant at 90° with a 15-mil ($38 \times 10^{-5}$ m) knife gap. The films were dried on the plate at 90° C. for 25 minutes, cooled to room temperature and dried in a vacuum oven at room temperature overnight. The films were stripped off the plate and further dried in a vacuum oven at 120° C. for 4 hours.

The films were tough and flexible and could be creased without cracking. These films, which averaged about 1.5 mil ($3.8 \times 10^{-5}$ m) in thickness, were clear and essentially colorless.

The above films were irradiated with light from a 450 watt Hanovia medium pressure mercury arc lamp for 15 minutes on each side of the film at less than 50° C. A portion of the film was placed into N-methylpyrrolidone, a good solvent for the uncrosslinked polymer. The majority of the film remained out of solution unswollen with a small amount of swollen polymer present.

Example 9

To a 50° C. stirred solution of 2,6-diaminotoluene (12.3 g, 0.10 mol) in N-methylpyrrolidone (200 ml) under an inert atmosphere was added 4,4'[2,2,2-trifluoro-1-(trifluoromethyl)-ethylidene]bis(1,2-benzenedicarboxylic anhydride) (44.4 g, 0.10 mol, the last portion washed in with 100 ml N-methylpyrrolidone). The resulting reaction solution was stirred at 50° C. overnight. A solution of acetic anhydride (37.9 ml, 0.402 mol) and triethylamine (56.5 ml, 0.405 mol) was rapidly added and the resulting reaction solution was allowed to stir at 50° C. for 2 hours. The reaction solution was precipitated in methanol, the resulting solid collected by filtration and washed with methanol and dried in a vacuum oven at room temperature overnight and at 100° C. for 5 hours and at 250° C. for 2 hours. The product was an off-white solid in 50.0 g yield.

This polyimide is soluble at greater than 20% solids (based on polymer weight) in acetone, dichloromethane, N-methylpyrrolidone, dimethyl sulfoxide and m-cresol.

Differential Scanning calorimetry (DSC) was performed on the above polymer using a Du Pont Thermal Analyzer Model 990-3 with cell model HCB1-S/N00523, Baseline slope=5.0 in a nitrogen atmosphere at a 10° C./minute rate. Transitions correlatable to a Tg were observed with an onset temperature of 339.20 C. and a midpoint temperature of 345° C.

Thermogravimetric Analysis (TGA) was performed on the above polymer using a Du Pont Thermogravimetric Analyzer Model 99-2 with cell Model 9Q1-5 in a nitrogen atmosphere at a 10° C./minute progress rate. A 5%.weight loss was observed at 535° C. and a 40% weight loss was observed at 575° C.

Films were cast from a 15% solution of the above polymer (based on weight) in N-methyl pyrrolidone onto a glass plate.treated with Du Pont TEFLON ® dry lubricant at 80° C. with a 15-mil ($38 \times 10^{-5}$ m) knife gap. The films were dried on the plate at 80° C. for 25 minutes, cooled to room temperature and dried in a vacuum oven at room temperature overnight. The films were stripped off the plate and further dried in a vacuum oven at 120° C. for 4 hours.

The films were tough and flexible and could be creased without cracking. These films, which averaged about 1.5 mil ($3.8 \times 10^{-5}$ m) in thickness, were clear and essentially colorless.

What is claimed:

1. An aromatic polyimide consisting essentially of repeating units having the formula:

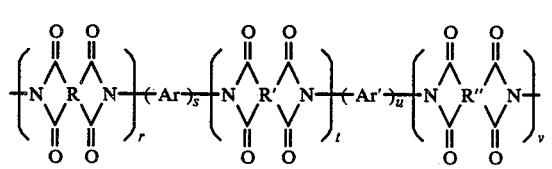

where —Ar— is

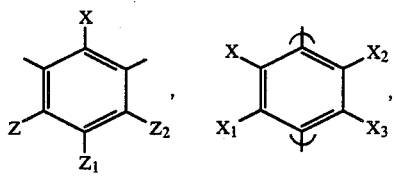

or mixtures thereof, —Ar'— is

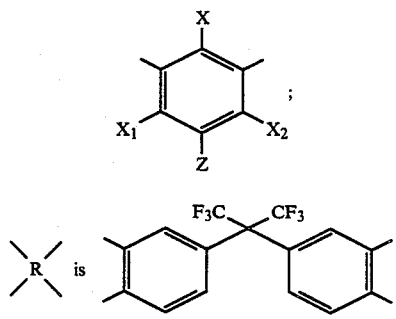

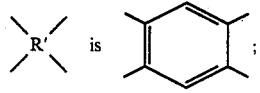

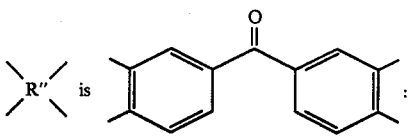

—X, —$X_1$, —$X_2$, —$X_3$ and —$X_4$ are independently primary or secondary alkyl groups having 1 to 6 carbon atoms, —Z, —$Z_1$, —$Z_2$, —$Z_3$, —$Z_4$ and —$Z_5$ are independently —H, or —X, r=100%—(t+v)
t=0–50% when v=0%
v=0–49%, when t=0%
s=100%—u
u=100% when (t+v)>1%.

2. The aromatic polyimide of claim 1 where v=0–25.

3. The aromatic polyimide of claim 2 wherein —X, —$X_1$, —$X_2$, —$X_3$, and —$CH_3$ or —$C_2H_5$.

4. The aromatic polyimide of claim 1 where t, u, and v are 0, —Ar— is

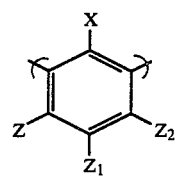

and —X, —Z and $Z_2$ are —$CH_3$ and $Z_1$ is —H.

5. The aromatic polyimide of claim 1 wherein where t, u, and v are 0, —Ar— is

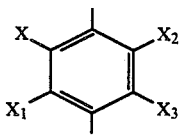

and —X, —$X_1$, —$X_2$ and —$X_3$ are —$CH_3$.

6. The aromatic polyimide of claim 1 where t, u, and v are 0, —Ar— is a mixture of

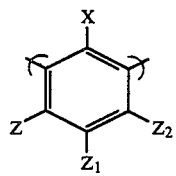

and

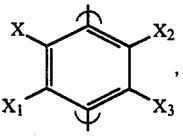

—X, —X$_1$, —X$_2$, —X$_3$, Z and Z$_2$ are —CH$_3$ and Z$_1$ is —H.

7. The aromatic polyimide of claim 1 wherein u and v are 0, t is 0–50, —Ar— is

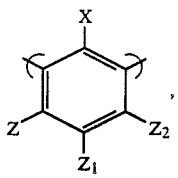,

—X, —Z and —Z$_2$ are —CH$_3$ and —Z$_1$ is —H.

8. The aromatic polyimide of claim 1 wherein t and u are 0, v is 0–49, —Ar— is

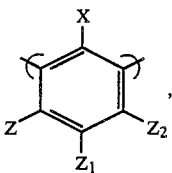,

—X, —Z and —Z$_2$ are —CH$_3$ and —Z$_1$ is —H.

9. The aromatic polyimide of claim 8 which has been crosslinked.

10. The aromatic polyimide of claim 1 wherein t, u, and v are 0 and —Z, —Z$_1$ and —Z$_2$ are —H.

11. A process for the preparation of polyimides according to claim 1, which comprises subjecting at least one tetracarboxylic acid, or dianhydride derived thereof, of the formula

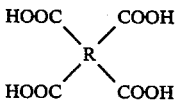

by itself or together with at least one tetracarboxylic acid, or dianhydride derived thereof, of formula

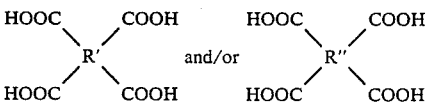

to a polycondensation reaction with at least one diamine of formula H$_2$N—Ar'—NH$_2$ and then cyclizing the formed polyamide acid under the influence of heat/or the action of dehydrating agents.

12. A process for the preparation of polyimides according to claim 1, which comprises subjecting at least one tetracarboxylic acid, or dianhydride derived thereof, of the formula

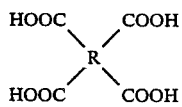

to a polycondensation reaction with at least one diamine of the formula H$_2$N—Ar—NH$_2$ and then cyclizing the formed polyamide acid under the influence of heat/or the action of dehydrating agents.

13. The method of claim 11 wherein the dehydrating agents are a solution of acetic anhydride and triethylamine.

14. The method of claim 12 wherein the dehydrating agents are a solution of acetic anhydride and triethylamine.

15. A coated material consisting of a carrier material onto which a coating of a polyimide according to claim 1 is applied.

16. A high temperature stable, highly optically transparent-to-colorless in the visible range aromatic polyimide film prepared from the polyimide according to claim 1.

* * * * *

UNITED STATES PATENT AND TRADEMARK OFFICE
CERTIFICATE OF CORRECTION

PATENT NO. : 4,912,197
DATED : March 27, 1990
INVENTOR(S) : Richard Allen Hayes

It is certified that error appears in the above—identified patent and that said Letters Patent is hereby corrected as shown below:

Claim 3, column 14, line, 25 after "$-X_3$, and" insert --$X_4$ are--.

Signed and Sealed this

Twenty-second Day of October, 1991

Attest:

HARRY F. MANBECK, JR.

*Attesting Officer*  Commissioner of Patents and Trademarks